United States Patent
Gärtner

[11] Patent Number: 6,029,451
[45] Date of Patent: Feb. 29, 2000

[54] METHOD OF OPERATING AN INTERNAL COMBUSTION ENGINE

[75] Inventor: Uwe Gärtner, Remshalden, Germany

[73] Assignee: Daimler Chrysler AG, Stuttgart, Germany

[21] Appl. No.: 09/131,001

[22] Filed: Aug. 7, 1998

[30] Foreign Application Priority Data

Aug. 8, 1997 [DE] Germany .......................... 197 34 494

[51] Int. Cl.[7] .................................................. F02M 25/07
[52] U.S. Cl. .................................. 60/605.2; 123/568.16; 123/704
[58] Field of Search .............................. 123/704, 568.16; 60/605.2, 276, 602, 603

[56] References Cited

U.S. PATENT DOCUMENTS

| | | | |
|---|---|---|---|
| 4,168,683 | 9/1979 | Hata et al. | 123/704 |
| 4,614,175 | 9/1986 | Asayama | 123/704 |
| 4,794,903 | 1/1989 | Suzuki | 123/568.16 |
| 4,823,760 | 4/1989 | Nishida | 123/704 |
| 5,778,674 | 7/1998 | Kimura | 60/602 |

FOREIGN PATENT DOCUMENTS

| | | |
|---|---|---|
| 0 574 614 | 12/1993 | European Pat. Off. . |
| 43 37 313 | 3/1995 | Germany . |

*Primary Examiner*—Willis R. Wolfe
*Attorney, Agent, or Firm*—Klaus J. Bach

[57] ABSTRACT

In a method and apparatus for operating an internal combustion engine having an air intake duct for supplying combustion air to the engine, an exhaust pipe for discharging exhaust gases from the engine, and an exhaust gas recirculation pipe extending between the exhaust pipe and the air intake duct and including an exhaust gas recirculation valve, oxygen sensors are provided in the air intake pipe and in the exhaust duct and are connected to a control unit which determines from the signals generated by the oxygen sensors the actual exhaust gas recirculation rate and dependent thereon controls the exhaust gas recirculation valve so as to generate a desired exhaust gas recirculation flow for the momentary engine operating point.

7 Claims, 1 Drawing Sheet

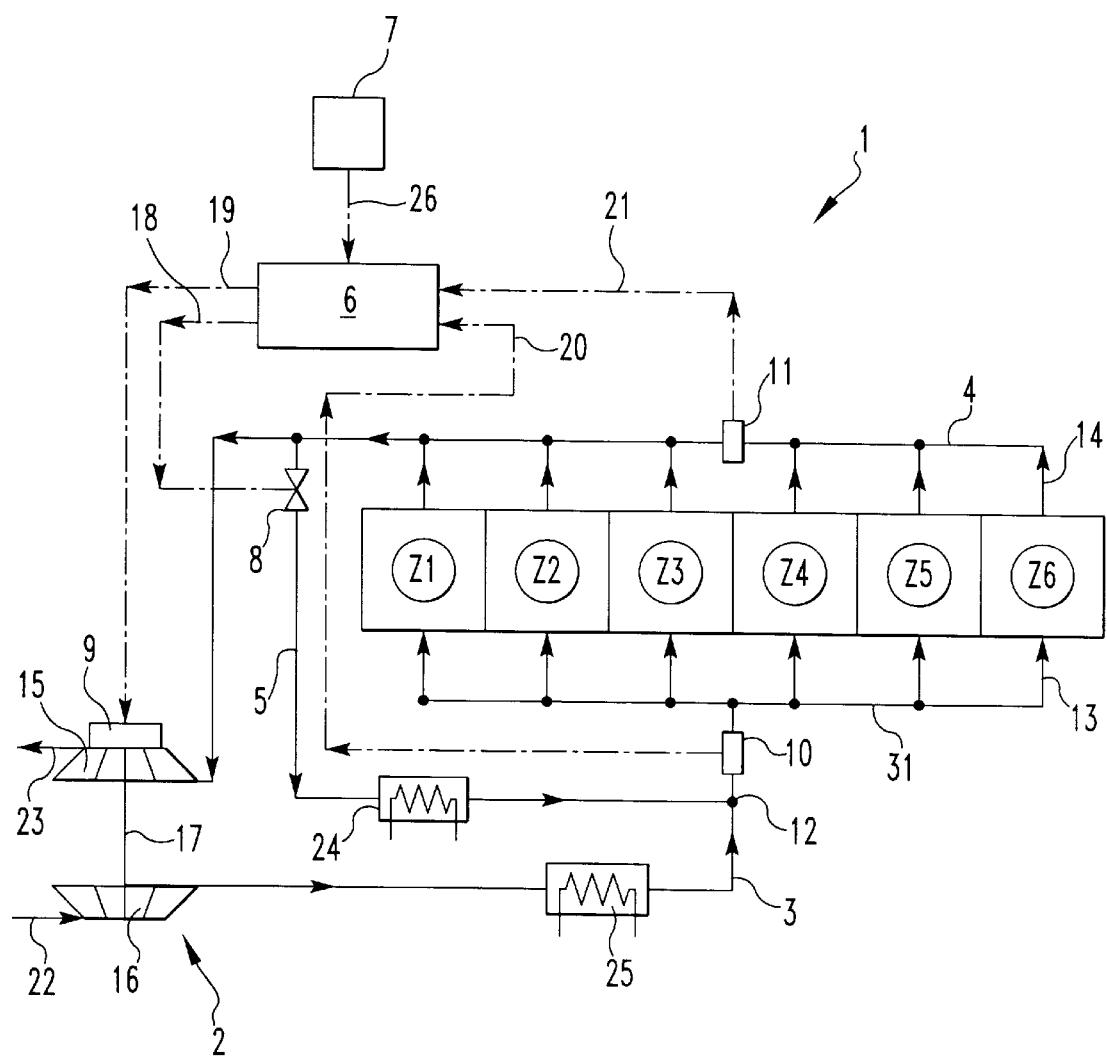

METHOD OF OPERATING AN INTERNAL COMBUSTION ENGINE

BACKGROUND OF THE INVENTION

The invention resides in a method of operating an internal combustion engine wherein exhaust gas is recirculated from an exhaust pipe to an intake duct of the engine in order to reduce engine emissions and the exhaust gas recirculation rate is controlled by an exhaust gas recirculation valve whose flow cross-section is controlled by a control unit depending on the engine operating point, and to an internal combustion engine suitable for performing the method.

The exhaust gas recirculation is an effective means for reducing exhaust emissions of an internal combustion engine. By admixing already burnt exhaust gases to be fresh gas admitted to the engine, it is possible to reduce particularly the temperature-dependent $NO_x$ emissions of the engine. Generally, exhaust gas is recirculated from an exhaust gas duct of the engine back to an engine intake duct. The recirculation rate for the exhaust gas, that is, the amount of exhaust gas admixed to the fresh air flow in the intake duct is controlled by a control unit depending on engine operating points recorded in a performance graph. An increase of the exhaust gas recirculation rate for further reduction of the nitrogen oxide emissions however is limited to degrees which depend on the respective engine operating points since, above a certain exhaust gas recirculation rate carbon and particle emissions increase, the fuel consumption increases or the engine running smoothness suffers.

The exhaust gas recirculation rate control requires that the recirculation conditions are constantly monitored during the operation of the engine. With simple control procedures for controlling the exhaust gas volume recirculated such as an engine operating condition-dependent control of an adjustable exhaust gas recirculation valve the exhaust gas emissions can be lowered only unsatisfactorily since, at any particular operating point, the recirculation rate must be lower than the optimum desired value in order to avoid the otherwise frequent transgression into an area where excessive carbon and correspondingly high emissions are generated.

EP 0 574 614 A1 discloses a method for controlling the exhaust gas recirculation rate which measures the pressure drop in a venturi nozzle arranged in the exhaust recirculation passage and determines from the pressure drop the actual recirculation gas flow volume. However, since the exhaust gas recirculation flow through the exhaust gas recirculation passage depends on the pressure drop between the exhaust gas pipe and the air intake duct of the internal combustion engine, the pressure loss in the venturi nozzle reduces the pressure drop available for the recirculation of the exhaust gas. In this way, the possible exhaust gas recirculation rate is reduced so that for many engine operating points the exhaust gas emissions cannot be optimally reduced. In addition, the determination of the exhaust gas flow volume in the exhaust gas recirculation pipe by way of measuring the differential pressure is very inaccurate since measurements by way of a venturi nozzle require laminar flow conditions which can practically not be achieved in the exhaust gas flow of internal combustion engines. The more or less turbulent exhaust gas flows of the various internal combustion engines, particularly of supercharged internal engines, prevent an effective control of the exhaust gas recirculation rate with the conventional methods.

DE 43 37 313 C1 proposes to measure the absolute pressure and the temperature in the exhaust gas pipe of an internal combustion engine in order to determine the recirculated exhaust gas volume. For determining the exhaust gas recirculation rate in addition to the static pressure also the back-up pressure of the exhaust gas is needed. With the shown methods however, an accurate determination of the exhaust gas recirculation rate which is absolutely needed for an optimal engine control is impossible since the necessary temperature and pressure sensors are exposed to very high temperatures. Furthermore, a high carbon particle content of the exhaust gas results in deposit formation on the sensors which increases with increasing engine operating times so that the measurements become increasingly inaccurate and finally lead to increased exhaust emissions.

It is the object of the present invention to provide for maximal emission reductions of internal combustion engines by accurately determining and controlling the exhaust gas recirculation rate.

SUMMARY OF THE INVENTION

In a method and apparatus for operating an internal combustion engine having an air intake duct for supplying combustion air to the engine, an exhaust pipe for discharging exhaust gases from the engine and an exhaust gas recirculation pipe extending between the exhaust pipe and the air intake duct and including an exhaust gas recirculation valve, oxygen sensors are provided in the air intake duct and in the exhaust duct and are connected to a control unit which determines from the signals generated by the oxygen sensors the actual exhaust gas recirculation rate and dependent thereon control the exhaust gas recirculation valve so as to generate a desired exhaust gas recirculation flow for any momentary engine operating point.

During the combustion process in the internal combustion engine the hydrocarbons of the fuel are reacted chemically with oxygen for the release of energy. Consequently, the exhaust gas contains substantially less oxygen than the fresh air which is supplied to the engine during engine operation. The recirculation of the oxygen-depleted exhaust gas results in a reduction of the oxygen concentration in the combustion air flow supplied to the internal combustion engine as compared to the oxygen concentration in the fresh air supply flow. In accordance with the invention the oxygen content in the supply air flow before and after the entry of the recirculated exhaust gas into the supply air flow, that is, before and after the jointure of the exhaust gas recirculation pipe and the combustion air supply duct, is measured by oxygen sensors extending into the combustion air flow. The measuring signals of the oxygen sensors are supplied to the input side of the control unit which determines from the measuring signals the difference of the oxygen concentrations and calculates therefrom the momentary exhaust gas recirculation rate during operation of the internal combustion engine. Preferably, the oxygen content in the combustion air flow is measured before the combustion air enters the internal combustion engine and the oxygen content of the exhaust gas flow is also measured whereby the recirculated exhaust gas volume can be accurately determined on the basis of the physical relationship.

By taking into consideration the exhaust gas recirculation rate and the oxygen content of the exhaust gas, the control unit can control the combustion air ratio during formation of the mixture in the internal combustion engine, that is, the ratio of the oxygen amount available during combustion relative to the amount required for a complete fuel combustion. For this purpose, the control unit controls another flow control member, which controls the fresh air flow before the recirculated exhaust gas flow is admixed. The flow control member may be a throttle valve in the air inlet duct or, if the invention is used in connection with a turbocharged internal combustion engine, a variable turbine geometry structure of the exhaust gas turbocharger.

A particularly accurate control of the combustion air ratio is obtained if the control unit adjusts the fuel admission alternately, or in addition, to the control member controlling the fresh air supply flow.

For an accurate control, a set point value for the combustion air ratio is provided to the control unit which value, 10 based on the accurate determination of the exhaust gas recirculation rate, is in the area of the maximum amount of exhaust gas that can be recirculated at a given engine operating point.

In a performance graph memory, the optimal set point values are recorded for a plurality of operating points of the internal combustion engine so that the control unit can retrieve these point values as guide values for the control of the exhaust gas recirculation rate as needed.

Below an embodiment of the invention will be described on the basis of the accompanying drawing.

BRIEF DESCRIPTION OF THE DRAWINGS

The sole FIGURE shows schematically a turbocharged six-cylinder engine utilizing an exhaust gas recirculation control arrangement in accordance with the invention.

DESCRIPTION OF THE PREFERRED EMBODIMENT

The FIGURE shows a turbocharged in-line internal combustion engine 1 with six cylinders 21 to 26. Combustion air is supplied to each cylinder 21 to 26 by way of a cylinder inlet 13. The exhaust gases are discharged by way of cylinder outlets 14 and a common exhaust pipe 4. An exhaust gas turbocharger 2 compresses fresh ambient air 22 and supplies the compressed air, by way of an intake pipe 3, to a charge air duct 3' which feeds the cylinder inlets 13 of all the cylinders 21 to 26. The turbocharger 2 includes a turbine 15, which is connected to the exhaust pipe 4 in a well known manner and through which the exhaust gases 23 flow. The turbine 15 drives a charge air compressor 16 by way of a charger shaft 17. Arranged in the intake pipe 3, there is a charge air cooler 25 in which the compressed charge air is cooled before it enters the charge air duct 3'. The inlet flow cross-section of the turbine 15 of the turbocharger 2 is variable by appropriate adjustment of a flow guide structure 9. By adjustment of the turbine flow guide vanes by means of the flow guide structure 9 of the turbine, the speed of the turbine 15 and of the compressor 16, which are mounted on a common charger shaft 17, and consequently the flow volume of the fresh ambient air supplied by the compressor, that is the compressor performance, can be controlled.

By way of an exhaust gas recirculation pipe 5, a partial exhaust gas flow is returned from the exhaust pipe 4 of the internal combustion engine back to the intake pipe 3 for reducing engine emissions; particularly the temperature-dependent nitrogen oxide emissions can be reduced by exhaust gas recirculation. An exhaust gas cooler 24 is disposed in the exhaust gas recirculation pipe before it joins the intake pipe 3 for the cooling of the recirculated exhaust gas before it is admixed to the compressed fresh air flow to the engine. Downstream of the jointure 12 of the exhaust gas recirculation pipe 5 with the intake pipe 3, the charge air flow comprising fresh air and recirculated exhaust gas enters the charge air duct 3'.

For dosing the recirculated exhaust gas flow, an exhaust gas recirculation valve 8 with an adjustable flow cross-section is disposed in the exhaust gas recirculation pipe 5. The exhaust gas recirculation valve 8 is controlled by a control signal 18 supplied by a control unit 6, the control signal being generated depending on the operating point of the internal combustion engine 1. The momentary operating point of the internal combustion engine is determined during engine operation by the control unit 6 by way of an evaluation of the operating parameters such as engine speed and engine load which are supplied to the control unit 6. The maximum recirculation gas flow volume depends on the operating point of the internal combustion engine: if the maximum recirculation rate is exceeded, that is, if an excessive amount of exhaust gas is recirculated the exhaust emissions are noticeably increased by an increased carbon content of the exhaust gas. In addition, fuel consumption of the internal combustion engine is increased.

For maximal emission reduction during operation of the internal combustion engine 1 by exhaust gas recirculation, the exhaust gas recirculation rate is controlled by the control unit 6 by a position control signal 18 wherein the operating point-specific optimal recirculation rate is provided as a guide value. The control unit 6 retrieves the guide value 26 for controlling the recirculation valve 8 from a performance graph memory 7 in which the optimal operating point set values are recorded for a multitude of engine operating points. The accurate actual exhaust gas recirculation rate value is determined by the control unit 6 from the measurement values of two oxygen sensors 10, 11 one of which is disposed in the intake pipe 3 after the jointure 12 of the exhaust gas recirculation pipe 5 and the other in the exhaust pipe 4 of the internal combustion engine. The oxygen sensors 10, 11 measure the oxygen content of the exhaust gas flow before it enters the intake pipe 3 and that of the combustion air flow downstream of the jointure 12 and provide measuring signals 20, 21 which are supplied to the control unit 6 for evaluation. From the measuring signal 21 of the oxygen sensor 11 in the exhaust pipe 4 and the measurement signal 20 of the oxygen sensor 10 in the intake pipe 3 which represent the oxygen content of the combustion air flow supplied to the cylinders 21 to 26 consisting of the compressed fresh ambient air and the recirculated exhaust gas, the control unit 6 determines the accurate actual exhaust gas recirculation rate R in accordance with following equation:

$$R = \frac{1}{\frac{[11] - [10]}{[10] - 0.23} + 1}$$

wherein R is the ratio of the recirculated exhaust gas volume to the total combustion air volume, [11] is the oxygen content of the exhaust gas flow as represented by the measuring signal of the oxygen sensor 11, and [10] is the oxygen content of the combustion air, which is determined from the measuring signal of the oxygen sensor 10 in the intake pipe 3 of the internal combustion engine indicating the oxygen content of the combustion air. The oxygen content of the compressed fresh ambient air 22 in the intake pipe 3 is the oxygen content of the ambient air, which is given in the equation as 23%.

As the equation (1) indicates the control unit 6 utilizes the respective difference between the oxygen concentrations of the fresh air and the combustion air on one hand and the combustion air and the exhaust gas on the other hand for determining the exhaust gas recirculation rate. The exhaust gas recirculation rate R can be determined for simple applications from from the measuring results of differential sensors which are simple in design and which are arranged in the gas flows to be measured and determine the respective differences of the oxygen contents as indicated above.

The determination of the absolute values of the oxygen content in the combustion air (sensor 10) and in the exhaust gas (sensor 11) as shown in embodiment shown in the figure makes it possible for the control unit 6 to control also the combustion air ratio for the formation of the air fuel mixture in the cylinders 21 to 26 of the internal combustion engine 1 taking into consideration the already precisely determined exhaust gas recirculation rate R and the oxygen content in the exhaust gas. The control unit generates a positioning signal 19 for the flow guide structure 9 of the exhaust gas turbocharger 2 and, by adjustment of the inlet flow cross-section of the turbine 15 for the exhaust gas flow, controls the fresh ambient air flow 22 delivered by the compressor of the turbocharger 2. In the control circuit, the combustion air ratio is adapted to an engine operating point-specific predetermined set value which is retrieved from the performance graph memory 7 like the set values of the exhaust gas recirculation rate. The exact set value for the combustion air ratio $\lambda_{AGR}$ during operation of the engine with exhaust gas recirculation is determined using the earlier determined exhaust gas recirculation rate R in accordance with the following equation:

$$\lambda_{AGR} = \lambda\left(1 + \frac{[11]}{0.23} \times \frac{R}{1-R}\right)$$

wherein $\lambda$ designates the combustion air ratio without consideration of the oxygen contained in the exhaust gas recirculation flow.

It can be calculated by the following equation:

$$\lambda = \frac{\frac{[11]}{14.5} + 0.23}{0.25 - [11]}$$

wherein [11] is the oxygen concentration in the exhaust gas and 23% is the oxygen content of the ambient air in wt % and 14.5 is the minimum air requirement of the engine during stoichiometric combustion in kg air/kg fuel.

With the very accurate determination of the exhaust gas recirculation rate R and the air ratio $\lambda_{AGR}$ the engine can be operated at maximum exhaust gas recirculation rates since as guide values for the control, the respective operating point specific maximum desired values can be provided. These maximum desired values will not be exceeded because of the precise determination of the actual values so that unacceptably low air rates will not be generated.

The control unit 6 provides in every operating point of the internal combustion engine for the maximum exhaust gas recirculation rate and the optimal combustion air ratio and generates appropriate control signals 18, 19 for the exhaust gas recirculation valve 8 and the turbine flow guide structure 9. Since the exhaust gas recirculation rate and the combustion air ratio are controlled concurrently and dependent from each other, a particular position of the flow guide structure 9 can clearly be assigned also to those operating points of the internal combustion engine in which the required air ratio can be generated with two different admission flow cross-sections of the turbine 15 of the turbocharger 2, that is, exactly that position which provides for the desired exhaust gas recirculation rate.

The determination and control of the exhaust gas recirculation rate can be achieved with little constructive input. The system is therefore also suitable for after market exhaust gas recirculation arrangements which are already installed in engines. The efficiency of internal combustion engines with exhaust gas recirculation systems can be substantially improved with the arrangement according to the present invention. The accurate determination of the exhaust gas recirculation rate from the measuring results of the oxygen sensors 10, 11 which sense the oxygen content in the gas flows before and after the recirculated exhaust gas joins the combustion air flow is in principle independent of the type of exhaust gas recirculation system or, respectively, the control equipment utilized.

What is claimed is:

1. An internal combustion engine including a turbocharger with a compressor and an exhaust gas turbine with a controllable gas admission flow guide structure, an air intake duct connected to said compressor for supplying combustion air to said engine, an exhaust pipe for discharging exhaust gas from said engine to said turbine, an exhaust gas recirculation pipe extending between said exhaust pipe and said air intake duct for recirculating exhaust gas from said exhaust pipe to said air intake duct, an exhaust gas recirculation valve arranged in said exhaust gas recirculation pipe for controlling the exhaust gas flow from said exhaust pipe to said air intake duct, an oxygen sensor arranged in said air intake duct downstream of the jointure of said exhaust gas recirculation pipe with said air intake duct, another oxygen sensor arranged in said exhaust pipe for sensing the oxygen content in said exhaust gas and a control unit to which said oxygen sensors are connected and which is connected to said exhaust gas recirculation valve and said turbine inlet flow guide structure for controlling said exhaust gas recirculation valve and said flow guide structure depending on the recirculation flow rate calculated from the sensor values provided by said oxygen sensors.

2. A method of operating on internal combustion engine including a turbocharger with a compressor and an exhaust gas turbine with a controllable gas admission flow guide structure, an air intake duct connected to said compressor for supplying combustion air to said engine, an exhaust pipe connected to said turbine for discharging exhaust gases from said engine to said turbine and an exhaust gas recirculation pipe extending between said exhaust pipe and said air intake duct for recirculating exhaust gas from said exhaust pipe to said combustion air intake duct and including an exhaust gas recirculation valve, said method comprising:

sensing the oxygen content of the exhaust gas discharged from said engine, sensing the oxygen content of the combustion air supplied to said engine, determining from the oxygen content sensed in the exhaust gas and from the oxygen content sensed in the combustion air being supplied to said engine the instantaneous exhaust gas recirculation rate and controlling said exhaust gas recirculation valve and said flow guide structure depending on predetermined engine operating point-dependent exhaust gas recirculation rates.

3. A method according to claim 1, wherein the oxygen content of said exhaust gas is measured in said exhaust pipe and the oxygen content of said combustion air is measured in said intake duct before the combustion air enters said engine but after the recirculated exhaust gas is admixed to the combustion air.

4. A method according to claim 1, wherein the differences of the oxygen concentrations between the fresh air flow and the combustion air flow before the combustion air enters the engine and also between the combustion air flow and the exhaust gas flow are determined and used for determining the control value for controlling the recirculation gas flow.

5. A method according to claim 1, wherein for a multitude of engine operating points the optimal engine operating values are stored in a memory from which they can be retrieved as needed to serve as guide values for the control of the exhaust gas recirculation flow.

6. A method according to claim 1, wherein said flow guide structure is controlled taking into consideration the exhaust gas recirculation rate and the oxygen content of the exhaust gas so as to generate a fresh air flow volume providing for a combustion air ratio during mixture formation in the internal combustion engine on the basis of a desired value of the combustion air ratio which is dependent on the respective engine operating point.

7. A method according to claim 6, wherein, by a control circuit for controlling the combustion air ratios, the fuel amount admixed to the combustion air is also controlled.

* * * * *